Dec. 7, 1954  R. W. BLAIR  2,696,412
ROLLER BEARING CONSTRUCTION
Filed Feb. 1, 1951
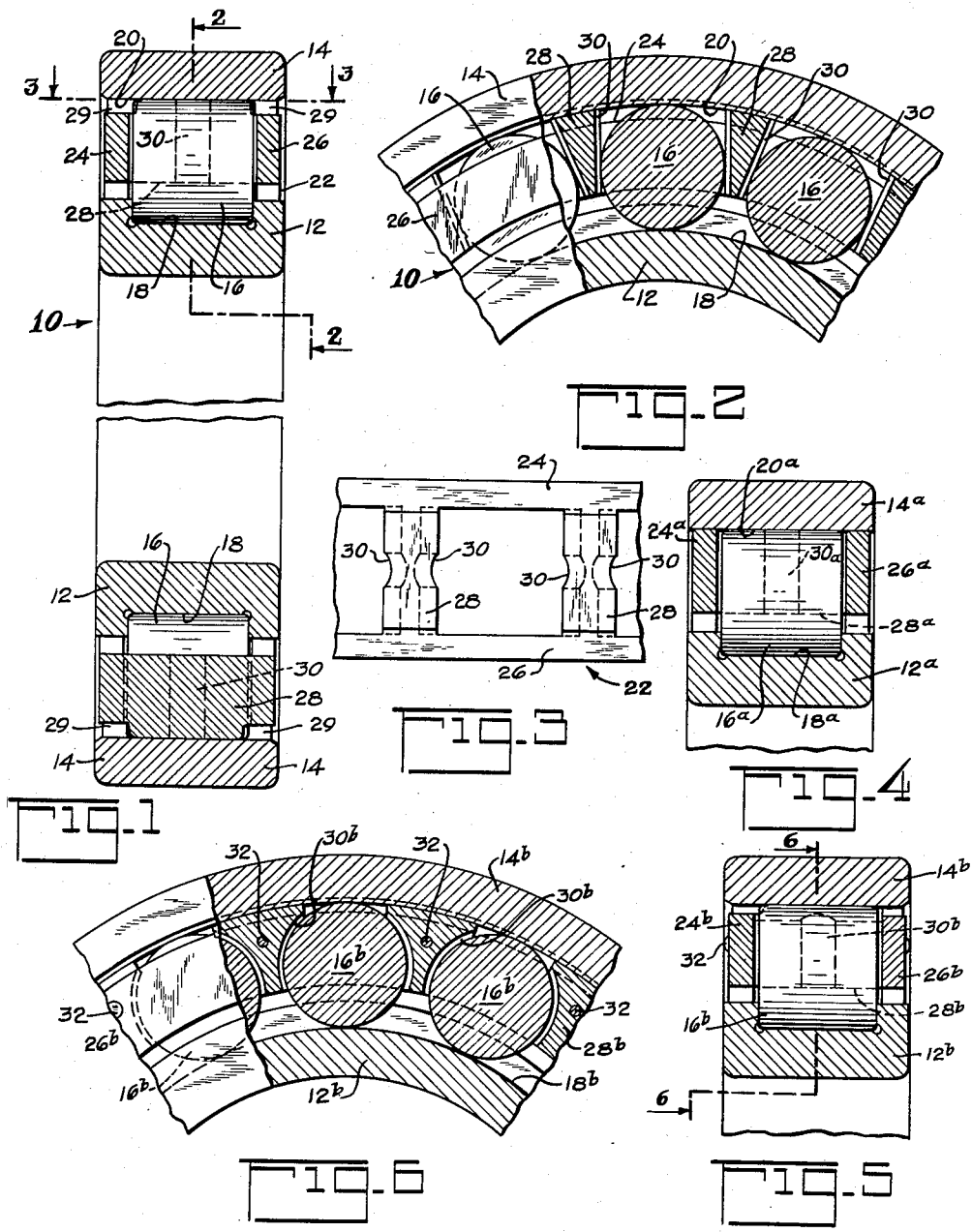
INVENTOR.
RICHARD W. BLAIR.
BY
ATTORNEY ered Dec. 7, 1954

2,696,412

ROLLER BEARING CONSTRUCTION

Richard W. Blair, Bloomfield, N. J., assignor to Curtiss-Wright Corporation, a corporation of Delaware Application February 1, 1951, Serial No. 208,905

4 Claims. (Cl. 308—213)

This invention relates to bearings and is particularly directed to an improved roller bearing construction.

The conventional roller bearing includes a cage for spacing the bearing rollers, said cage comprising a pair of end rings interconnected by circumferentially-spaced webs between which the rollers are disposed. Particularly in the case of a roller bearing for a high speed shaft, the roller bearing cage is subjected to high stresses and therefore is piloted or centered on one of the bearing races, generally on the outer bearing race. In accordance with conventional prior art roller bearing construction the bearing cage is piloted or centered with respect to the bearing races by engagement of the end rings of said cage with the outer race. The axial length of each end ring of a bearing cage is relatively short compared to its circumferential length so that it is difficult to lubricate the engaging surfaces of said end rings and bearing race whereby the load carrying capacity of said engaging surfaces is small.

An object of the present invention comprises the provision of a roller cage construction in which the cage is piloted or centered on a bearing race in such a manner that said cage and race have superior load carrying capacity compared to said prior art construction. In accordance with the present invention, the cage of a roller bearing is centered on the outer bearing race by means of the roller separating webs of said cage.

A further object of the invention comprises the provision of an improved roller bearing cage construction whereby lubrication of the engaging surfaces of the cage and bearing race is facilitated.

Other objects of the invention will become apparent upon reading the annexed detailed description in connection with the drawing, in which:

Figure 1 is an axial sectional view of a roller bearing embodying the invention;

Figure 2 is a view, partly in section, taken along line 2—2 of Figure 1;

Figure 3 is a developed view of the roller cage taken along line 3—3 of Figure 1;

Figures 4 and 5 are views similar to Figure 1 but illustrating modifications of the invention; and Figure 6 is a view, partly in section, taken along line 6—6 of Figure 5.

Referring first to Figs. 1-3 of the drawing, a roller bearing 10 is illustrated as comprising an annular inner race 12, an annular outer race 14 and a plurality of circumferentially-spaced rollers 16 are disposed between and in rolling engagement with the co-axial cylindrical surfaces 18 and 20 of the races 12 and 14 respectively. A cage 22 is provided for maintaining the circumferential spacing of the rollers 16. Said cage comprises a pair of axially spaced end rings 24 and 26 disposed across the ends of the rollers. The end rings 24 and 26 are interconnected by circumferentially-spaced webs 28 extending between the rollers 16 for spacing said rollers. The bearing construction so far described is conventional.

As illustrated the roller engaging surface 20 of the outer race 14 is of uniform diameter from one end to the other whereby lubricating oil cannot be trapped on said surface as a result of centrifugal forces acting on said oil. This feature is important in the case of high speed bearings because if the bearing rollers run immersed in oil then the generation of heat and absorption of said heat by the oil becomes excessive.

Each of the roller spacing webs 28 of the bearing cage 22 has an outer cylindrical surface of substantially the same diameter and disposed in engagement with the inner surface 20 of the outer race 14 for centering the cage with respect to the bearing races, the inner diameter of said webs being substantially greater than that of the adjacent outer surface 18 of the inner race 12. The outer diameter of the end rings 24 and 26 of the bearing cage is substantially less than that of the inner surface 20 of the outer bearing race 14 whereby there is substantial clearance between the rings 24 and 26 and the bearing race 14. Similarly there is substantial clearance between the rings 24 and 26 and the inner bearing race 12, the webs 28 and rings 24 and 26 being illustrated as having the same inner diameter.

In accordance with a conventional prior art construction, the bearing cage is centered by engagement of the cage end rings with a bearing race. However, the axial width of each end ring of a bearing cage is small compared to its circumferential length thereby making it difficult to lubricate the engaging surfaces of said cage and end rings due to high end leakage from said surfaces whereby the load carrying capacity of said engaging surfaces is low. With the construction of the present invention, however, the cage loads are transmitted to a bearing race by the cage webs. Each cage web has a relatively long axial width compared to its circumferential length whereby the end leakage of lubricating oil from the outer surfaces of said webs is low and the load carrying capacity of said webs is relatively high.

Fig. 4 illustrates a modified bearing construction in which corresponding parts of the bearing have been designated by the same reference numerals used in Fig. 1-3 but with a subscript a added thereto. Accordingly, only that much of Fig. 4 differing from Figs. 1-3 is specifically described.

In Fig. 4 the cage end rings 24a and 26a as well as the cage webs 28a engage the outer bearing race 14a for centering the cage relative to the bearing races. Thus with the construction of Fig. 4 the bearing cage construction is somewhat simpler from that of Figs. 1-3 and in addition in Fig. 4 the loads on the cage are carried by both the cage end rings and by the cage webs instead of entirely by the cage webs as in Fig. 3. With the bearing cage construction of Fig. 3, however, the bearing surface 20 is more readily lubricated as compared to lubrication of the bearing surface 20a of Fig. 4. Thus in Fig. 3 lubricating oil can readily reach the portions of the outer bearing race surface 20 engaging the rollers 16 and the cage webs 28 through the clearance 29 between the cage end rings and said surface 20.

In order to facilitate oil reaching the bearing surface of the outer bearing race 14a, the cage webs 28a may be provided with grooves 30a extending radially along the sides of the webs 28a from the inner to the outer ends of said webs. With the grooves 30a, lubricating oil readily flows along said grooves radially outwardly past the rollers under the action of the centrifugal forces acting on said oil thereby insuring adequate lubrication of the bearing surface 20a. If desired, grooves 30 similar to the grooves 30a may be provided along the sides of the cage webs 28 of Figs. 1-3 so that lubricating oil may also reach the bearing surface 20 via the grooves 30 as well as through the clearance 29 between the cage end rings 24 and 26 and said surface 20.

Figs. 5 and 6 illustrate a further modification in which the bearing area on the outer ends of the cage webs is increased. The parts of Figs. 5 and 6 have been designated by the same reference numerals as the corresponding parts of Figs. 1-3 but with a subscript b added thereto so that it is only necessary to describe those parts of Figs. 5 and 6 differing from Figs. 1-3.

As illustrated the construction of Figs. 5 and 6 is similar to that of Figs. 1-3 except the side walls of the cage webs 28b, instead of being made straight, have been made cylindrical, as by end milling, so as to fit about the rollers 16b thereby substantially increasing the width of the outer ends of the webs 28b. Obviously the bearing of Fig. 4 may be similarly modified to increase the width of the outer ends of the cage webs 28a. With the cage webs 28b thus fitted about the rollers 16b the cage must be made in two or more parts to permit assembly of the rollers within the cage. For example the webs 28b may be found integral with the end ring 24b with the end ring 26b secured thereto by means of rivets 32. The cage construction of Figs. 5 and 6 has the further advantage in that with said construction the cage accurately locates the rollers radially thereby facilitating assembly of the bearing.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim:

1. A roller bearing comprising an inner race member; an outer race member; a plurality of circumferentially-spaced rollers disposed between said race members; and a cage for maintaining the circumferential spacing of said rollers, said cage including a pair of axially-spaced rings disposed across the ends of said rollers and a plurality of circumferentially-spaced webs secured to said rings and extending between said rollers, each of said rings being surrounded by said outer race member and having an outer diameter substantially less than the inner diameter of said outer race member to provide radial clearance therebetween and each of said webs having its outer surface disposed in engagement with the inner surface of said outer race member.

2. A roller bearing comprising an inner race member; an outer race member; a plurality of circumferentially-spaced rollers disposed between said race members; and a cage for maintaining the circumferential spacing of said rollers, said cage including a pair of axially-spaced rings disposed across the ends of said rollers and a plurality of circumferentially-spaced webs secured to said rings and extending between said rollers, each of said rings being surrounded by said outer race member and having an outer diameter substantially less than the inner diameter of said outer race member to provide radial clearance therebetween and each of said webs having its outer surface disposed in engagement with the inner surface of said outer race member, each roller engaging side of said webs having a groove forming a passage extending from the radially inner to the radially outer portion of the region of contact of the adjacent roller with said cage side.

3. A roller bearing comprising an inner race member; an outer race member having a cylindrical inner surface of substantially constant diameter from one end of said surface to the other; a plurality of circumferentially-spaced rollers disposed between said race members; and a cage for maintaining the circumferential spacing of said rollers, said cage including a pair of axially-spaced rings disposed across the ends of said rollers and a plurality of circumferentially-spaced webs secured to said rings and extending between said rollers, each of said rings being surrounded by said outer race member and having an outer diameter substantially less than the inner diameter of said outer race member to provide radial clearance therebetween and each of said webs having its outer surface disposed in engagement with the inner surface of said outer race member.

4. A roller bearing comprising an inner race member; an outer race member having a cylindrical inner surface of substantially constant diameter from one end of said surface to the other; a plurality of circumferentially-spaced rollers disposed between said race members; and a cage for maintaining the circumferential spacing of said rollers, said cage including a pair of axially-spaced rings disposed across the ends of said rollers and a plurality of circumferentially-spaced webs secured to said rings and extending between said rollers, each of said rings being surrounded by said outer race member and having an outer diameter substantially less than the inner diameter of said outer race member to provide radial clearance therebetween and each of said webs having its outer surface disposed in engagement with the inner surface of said outer race member, each roller engaging side of said webs having a groove forming a passage extending from the radially inner to the radially outer portion of the region of contact of the adjacent roller with said cage side.

References Cited in the file of this patent

UNITED STATES PATENTS

| Number | Name | Date |
|---|---|---|
| 926,967 | Steenstrup et al. | July 6, 1909 |
| 1,668,112 | Gibbons | May 1, 1928 |
| 1,971,782 | Herrmann | Aug. 28, 1934 |
| 2,063,738 | Hedgecock | Dec. 8, 1936 |

FOREIGN PATENTS

| Number | Country | Date |
|---|---|---|
| 55,223 | Sweden | July 24, 1920 |